US010728805B2

(12) United States Patent
Deng et al.

(10) Patent No.: US 10,728,805 B2
(45) Date of Patent: Jul. 28, 2020

(54) BEARER ESTABLISHMENT METHOD AND APPARATUS

(71) Applicant: HUAWEI TECHNOLOGIES CO., LTD., Shenzhen, Guangdong (CN)

(72) Inventors: Qiang Deng, Shenzhen (CN); Yanmei Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/359,536

(22) Filed: Mar. 20, 2019

(65) Prior Publication Data
US 2019/0223061 A1 Jul. 18, 2019

Related U.S. Application Data

(63) Continuation of application No. PCT/CN2016/101085, filed on Sep. 30, 2016.

(51) Int. Cl.
H04W 36/00 (2009.01)
H04W 36/12 (2009.01)
H04W 36/08 (2009.01)

(52) U.S. Cl.
CPC ....... H04W 36/0022 (2013.01); H04W 36/00 (2013.01); H04W 36/0016 (2013.01);
(Continued)

(58) Field of Classification Search
CPC ............ H04W 36/0022; H04W 36/00; H04W 36/0016; H04W 36/0077; H04W 36/08; H04W 36/12
See application file for complete search history.

(56) References Cited

U.S. PATENT DOCUMENTS 9,480,092 B2 * 10/2016 Horn .................... H04W 76/12
10,225,778 B2 * 3/2019 Yu ....................... H04W 36/165
(Continued)

FOREIGN PATENT DOCUMENTS

CN 102131259 A 7/2011
CN 105517073 A 4/2016
(Continued)

OTHER PUBLICATIONS

Extended European Search Report dated May 7, 2019 in corresponding European Patent Application No. 16917279.8 (11 pages).
(Continued)

Primary Examiner — Khai M Nguyen
(74) Attorney, Agent, or Firm — Leydig, Voit & Mayer, Ltd.

(57) ABSTRACT

Embodiments of the present application relate to the communications field, and provide a bearer establishment method and apparatus, and a system. The method includes: sending, by an eNB, a first request message to an MME in a handover process of UE; determining, by the MME, a target SGW and a target PGW of the UE based on the first request message; requesting, by the MME, the target SGW to establish a first bearer between the target SGW and the target PGW for the UE; and after the first bearer is established, requesting, by the MME, a source eNB to release a radio bearer and delete a second bearer on the source side. In the present application, a process of establishing the first bearer and the cell handover process are completed in parallel, so that the terminal can perform communication through the first bearer after a cell handover.

14 Claims, 10 Drawing Sheets

(52) U.S. Cl.
CPC ....... *H04W 36/0077* (2013.01); *H04W 36/08* (2013.01); *H04W 36/12* (2013.01)

(56) References Cited

U.S. PATENT DOCUMENTS

| | | | |
|---|---|---|---|
| 2008/0192697 A1* | 8/2008 | Shaheen | H04W 36/0061 370/331 |
| 2012/0182972 A1* | 7/2012 | Guan | H04W 76/11 370/331 |
| 2012/0258766 A1* | 10/2012 | Cho | H04W 36/14 455/525 |
| 2014/0094146 A1* | 4/2014 | Xu | H04W 36/0055 455/411 |
| 2015/0156660 A1* | 6/2015 | Luo | H04W 8/02 370/230 |
| 2015/0249999 A1 | 9/2015 | Kaipallimalil et al. | |

FOREIGN PATENT DOCUMENTS

| | | |
|---|---|---|
| CN | 105611590 A | 5/2016 |
| CN | 105657756 A | 6/2016 |
| EP | 3445090 A1 | 2/2019 |
| WO | 2010113528 A1 | 10/2010 |
| WO | 2012136097 A1 | 10/2012 |
| WO | 2016053435 A1 | 4/2016 |

OTHER PUBLICATIONS

International Search Report dated Jun. 21, 2017 in corresponding International Application No. PCT/CN2016/101085.

3GPP TR 23.785 V14.0.0 (Sep. 2016), "3rd Generation Partnership Project; Technical Specification Group Services and System Aspects; Study on architecture enhancements for LTE support of V2X services (Release 14)," pp. 1-52.

3GPP TS 23.401 V14.1.0 (Sep. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 14)," pp. 1-379.

International Search Report, dated Jun. 21, 2017, in International Application No. PCT/CN2016/101085 (4 pp.).

Written Opinion of the International Searching Authority, dated Jun. 21, 2017, in International Application No. PCT/CN2016/101085 (7 pp.).

\* cited by examiner

BEARER ESTABLISHMENT METHOD AND APPARATUS

CROSS-REFERENCE TO RELATED APPLICATIONS

This application is a continuation of International Application No. PCT/CN2016/101085, filed on Sep. 30, 2016, the disclosure of which is hereby incorporated by reference in its entirety.

TECHNICAL FIELD

This disclosure relates to the communications field, and in particular, to a bearer establishment method and apparatus.

BACKGROUND

In the Intelligent Transportation System (ITS), various types of information related to transportation are obtained in a timely manner through vehicle to vehicle (V2V) communication, vehicle to infrastructure (V2I) communication, vehicle-to-pedestrian (V2P) communication, or vehicle-to-network (V2N) communication. These communication manners may be collectively referred to as vehicle-to-everything (V2X) communication. X is a collective term for vehicles, infrastructures, pedestrians, and networks.

When a V2X message is transmitted from one user equipment (UE) to another UE by using a Long Term Evolution (LTE) technology, the message needs to be transmitted through a packet data network (PDN) connection. As shown in FIG. 1, a typical PDN connection includes a radio bearer 11, an S1 bearer 12, and an S5/S8 bearer 13. The radio bearer 11 is a bearer between the UE and an evolved NodeB (eNB). The S1 bearer 12 is a bearer between the eNB and a serving gateway (SGW). The S5/S8 bearer 13 is a bearer between the SGW and a packet data network gateway (PGW).

In a conventional cell handover (Handover) process, because PGWs are centrally deployed, a PGW corresponding to the UE remains unchanged in the cell handover process. However, in V2X communication, because the PGW is deployed near the eNB in a form of a local gateway (LGW), the UE may further need to be handed over between different PGWs. Specifically, a cell handover process 22 and a PGW handover process 24 are mutually separate. Usually, the cell handover process 22 is first performed, and then the PGW handover process 24 is performed. As shown in FIG. 2, in the cell handover process 22 based on an X2 interface, after establishing a second radio bearer with UE, a target eNB sends a request message to an MME. After receiving the request message, the MME executes a modify session (Modify Session) procedure. In the modify session procedure, a first S1 bearer is changed to a second S1 bearer, and a first S5/S8 bearer between a source SGW and a source PGW is not changed. After the cell handover process 22 ends, due to a factor such as a tracking area update (TAU) procedure, the MME is further triggered to determine whether the UE needs to perform PGW handover. If the UE needs to perform PGW handover, the MME triggers the target eNB to release the second S1 bearer, and triggers the source SGW to release the first S5/S8 bearer. In addition, the MME further triggers the target eNB to establish a third S1 bearer, and triggers the target SGW to establish a second S5/S8 bearer. Then, the UE communicates with an application server in the Internet through the second radio bearer, the third S1 bearer, and the second S5/S8 bearer. Because the second S5/S8 bearer is established after the cell handover process, relatively long handover time needs to be consumed starting from a moment at which the UE performs cell handover to a moment at which the UE can communicate with the application server in the Internet, and consequently a performance requirement of V2X communication on a transmission latency cannot be met.

SUMMARY

This application provides a bearer establishment method and apparatus, to resolve the following problem: Time consumed in an entire handover process is relatively long, and consequently a performance requirement of V2X communication on a transmission latency cannot be met. Technical solutions are as follows:

This application provides a technical solution for establishing a bearer for a terminal in a cell handover process, so that a PGW handover process and the cell handover process are simultaneously executed, to reduce time consumed in an entire handover process.

According to a first aspect, a bearer establishment method is provided, where the method includes:

receiving, by a mobility management entity, a first request message sent by an access network device, where the first request message is sent by the access network device in a cell handover process of a terminal, and the access network device is a source access network device of the terminal or a target access network device of the terminal;

determining, by the mobility management entity, a target serving gateway of the terminal and a target packet data network gateway of the terminal based on the first request message;

sending, by the mobility management entity, a second request message to the target serving gateway, where the second request message is used to request the target serving gateway to establish a first bearer for the terminal, and the first bearer is a bearer between the target serving gateway and the target packet data network gateway;

receiving, by the mobility management entity, a second response message sent by the target serving gateway, where the second response message carries an IP address assigned by the target packet data network gateway to the terminal; and sending, by the mobility management entity, the IP address to the terminal.

In this implementation, the first request message is a message sent by the access network device to the mobility management entity in the cell handover process of the terminal. After the mobility management entity receives the first request message, the mobility management entity determines the target serving gateway and the target packet data network gateway based on the first request message, and requests the target serving gateway to establish the first bearer for the terminal. In this way, a process of establishing the first bearer and the cell handover process are completed in parallel, so that the terminal can perform communication through the first bearer after a cell handover. Therefore, time consumed in an entire handover process is reduced, and a requirement of a V2X message on a transmission latency is met.

In a first possible implementation of the first aspect, the first request message carries an identifier of a target cell of the terminal, and the determining, by the mobility management entity, a target serving gateway of the terminal and a target packet data network gateway of the terminal based on the first request message includes:

obtaining, by the mobility management entity, the identifier of the target cell from the first request message; and determining, by the mobility management entity, the target serving gateway of the terminal and the target packet data network gateway of the terminal based on the identifier of the target cell.

In this implementation, because the mobility management entity determines the target serving gateway and the target packet data network gateway based on the identifier of the target cell, the mobility management entity can select a target serving gateway and a target packet data network gateway between which and the target cell a minimum transmission latency exists, to meet the requirement of the V2X message on the transmission latency as much as possible.

With reference to the first aspect or the first possible implementation of the first aspect, in a second possible implementation of the first aspect, the access network device is the source access network device of the terminal, and the first request message is a handover request message; or the access network device is the target access network device of the terminal, and the first request message is a path switch request message.

In this implementation, for a handover process based on an X2 interface, the first request message is a path switch request message; and for a handover process based on an S1 interface, the first request message is a handover request message. In this way, this implementation can be applied to the handover process based on the X2 interface, and can also be applied to the handover process based on the S1 interface, thereby increasing a range of an application scenario of this implementation.

With reference to any one of the first aspect, the first possible implementation of the first aspect, or the second possible implementation of the first aspect, in a third possible implementation of the first aspect, the second request message includes first indication information; and the first indication information is used to instruct the target serving gateway to establish the first bearer for the terminal.

With reference to any one of the first aspect, the first possible implementation of the first aspect, the second possible implementation of the first aspect, or the third possible implementation of the first aspect, in a fourth possible implementation of the first aspect, after the receiving, by the mobility management entity, a second response message sent by the target serving gateway, the method further includes:

sending, by the mobility management entity, a third request message to a source serving gateway of the terminal, where the third request message is used to request the source serving gateway to delete a second bearer corresponding to the terminal, and the second bearer is a bearer between the source serving gateway and a source packet data network gateway of the terminal; and receiving, by the mobility management entity, a third response message sent by the source serving gateway.

In this implementation, the first bearer between the target serving gateway and the target packet data network gateway is first established for the terminal, and then the second bearer between the source serving gateway and the source packet data network gateway side is released for the terminal. This belongs to "soft handover". Therefore, session continuity of the terminal is ensured, and no interruption occurs.

With reference to any one of the first aspect, the first possible implementation of the first aspect, the second possible implementation of the first aspect, the third possible implementation of the first aspect, or the fourth possible implementation of the first aspect, in a fifth possible implementation of the first aspect, the third request message includes second indication information, and the second indication information is used to instruct the source serving gateway to delete the second bearer corresponding to the terminal.

According to a second aspect, a bearer establishment apparatus is provided, where the apparatus includes at least one unit, and the at least one unit is configured to implement the bearer establishment method provided in any one of the first aspect or the possible implementations of the first aspect.

According to a third aspect, an embodiment of the present application provides a mobility management entity, where the mobility management entity includes a processor, a memory, and a communications interface, the processor is configured to store one or more instructions, the instructions are used to be executed by the processor, and the processor is configured to implement the bearer establishment method provided in any one of the first aspect or the possible implementations of the first aspect.

According to a fourth aspect, an embodiment of the present application provides a computer readable storage medium, where the computer readable storage medium stores an executable program used for implementing the bearer establishment method provided in any one of the first aspect or the possible designs of the first aspect.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show only some embodiments of the present application, and a person of ordinary skill in the art may derive other drawings from these accompanying drawings without creative efforts.

FIG. 5B-1 and FIG. 5B-2 are a flowchart of a second part of a bearer establishment method according to an embodiment of the present application;

FIG. 5C-1 and FIG. 5C-2 are a diagram of a transmission path of uplink/downlink data of UE in a PDN connection according to an embodiment of the present application;

DESCRIPTION OF EMBODIMENTS

To make the objectives, technical solutions, and advantages of the present application clearer, the following further describes the implementations of the present application in detail with reference to the accompanying drawings.

Figure 3:
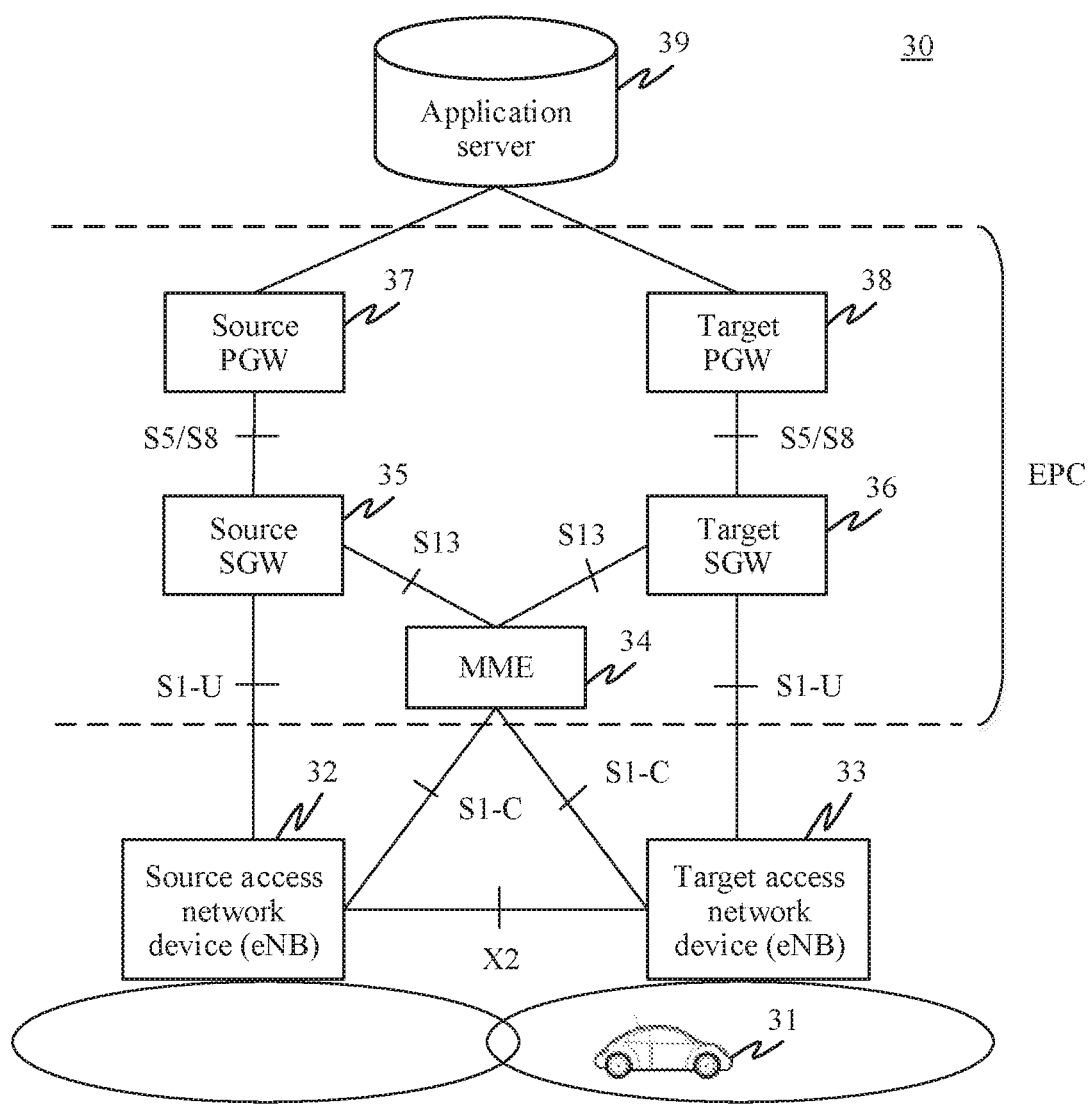
FIG. 3 is a schematic structural diagram of a communications system according to an embodiment of the present application.

FIG. 3 is a schematic structural diagram of a communications system 30 according to an embodiment of the present application. The communications system 30 may be an Internet of Vehicles system used to transmit a V2X message. The communications system 30 includes a terminal 31, a source access network device 32, a target access network device 33, an MME 34, a source SGW 35, a target SGW 36, a source PGW 37, a target PGW 38, and an application server 39.

The terminal 31 is a terminal configured to receive/send a V2X message. Optionally, the terminal 31 is a terminal disposed on a vehicle (Vehicle). A V2X application program is run on the terminal 31. When different communication protocols are used, the terminal 31 in this embodiment of the present application may be referred to as a subscriber unit (Subscriber Unit), a subscriber station (Subscriber Station), a mobile station (Mobile Station), a remote station (Remote Station), an access point (Access Point), a remote terminal (Remote Terminal), an access terminal (Access Terminal), a user terminal (User Terminal), a user agent (User Agent), user equipment (UE), or the like. This is not limited in this application.

The terminal 31 communicates with the source access network device 32 through an air interface, or the terminal 31 communicates with the target access network device 33 through an air interface.

The source access network device 32 and the target access network device 33 are any two adjacent access network devices in the communications system 30, and the access network device is also referred to as an access network network element. Each access network device is responsible for all radio-related functions in one or more cells. The source access network device 32 and the target access network device 33 may be base stations. For example, the base station may be a base transceiver station (BTS) in a Global System for Mobile communications (GSM) or Code Division Multiple Access (CDMA), or may be a NodeB (NodeB) in Wideband Code Division Multiple Access (WCDMA), or may be an evolved NodeB (eNB or eNodeB) in LTE. This is not limited in this application.

The source access network device 32 is connected to the target access network device 33 through an X2 interface.

Each access network device is connected to a core network through an S1 interface. The core network is also referred to as an evolved packet core (EPC). Specifically, the source access network device 32 and the target access network device 33 each are connected to the MME 34 by using an S1 control plane part (an S1-C interface in the figure). The source access network device 32 is connected to the source SGW 35 by using an S1 user plane part (an S1-U interface in the figure), and the target access network device 32 is connected to the target SGW 36 through an S1-U interface.

The MME 34 is a control plane node of the EPC. The MME 34 is responsible for bearer connection/release of the terminal 31. Optionally, a function operation between the MME 34 and the terminal 31 may be referred to as a non-access stratum (NAS). Different from the non-access stratum, an access stratum (AS) mainly processes a function operation between the terminal 31 and the access network device.

The source SGW 35 and the target SGW 36 are user plane nodes of the EPC. The SGW is a mobility anchor used when the terminal 31 moves between different access network devices.

The MME 34 is connected to the source SGW 35 through an S11 interface. The MME 34 is connected to the target SGW 36 through an S11 interface. The source SGW 35 is further connected to the source PGW 37 through an S5/S8 interface. The target SGW 36 is further connected to the target PGW 38 through an S5/S8 interface.

Optionally, the source PGW 37 and the target PGW 38 are deployed near the access network device in a form of an LGW. The source PGW 37 and the target PGW 38 are configured to connect the EPC to the Internet. In this embodiment, the source PGW 37 and the target PGW 38 are connected to a V2X application server 39 in the Internet.

The V2X application server 39 is configured to provide a background service for a V2X application on the terminal 31.

In addition, the communications system 30 further includes another type of node such as a Multimedia Broadcast Multicast Service (MBMS) or a home subscriber server (HSS). FIG. 3 does not show all possible nodes. However, no limitation is imposed on the communications system 30.

It should be noted that all the nodes described above are logical nodes. In an actual implementation, some of these nodes may be combined together. For example, the source SGW 35 and the source PGW 37 are usually combined and implemented in one physical node, and the target SGW 36 and the target PGW 38 are usually combined and implemented in one physical node.

It should be further noted that, when a 5th generation mobile communications technology 5G is used in the foregoing communications system, the foregoing network elements may have different names but have a same or similar function in a 5G system. This is not limited in this application.

Figure 4:
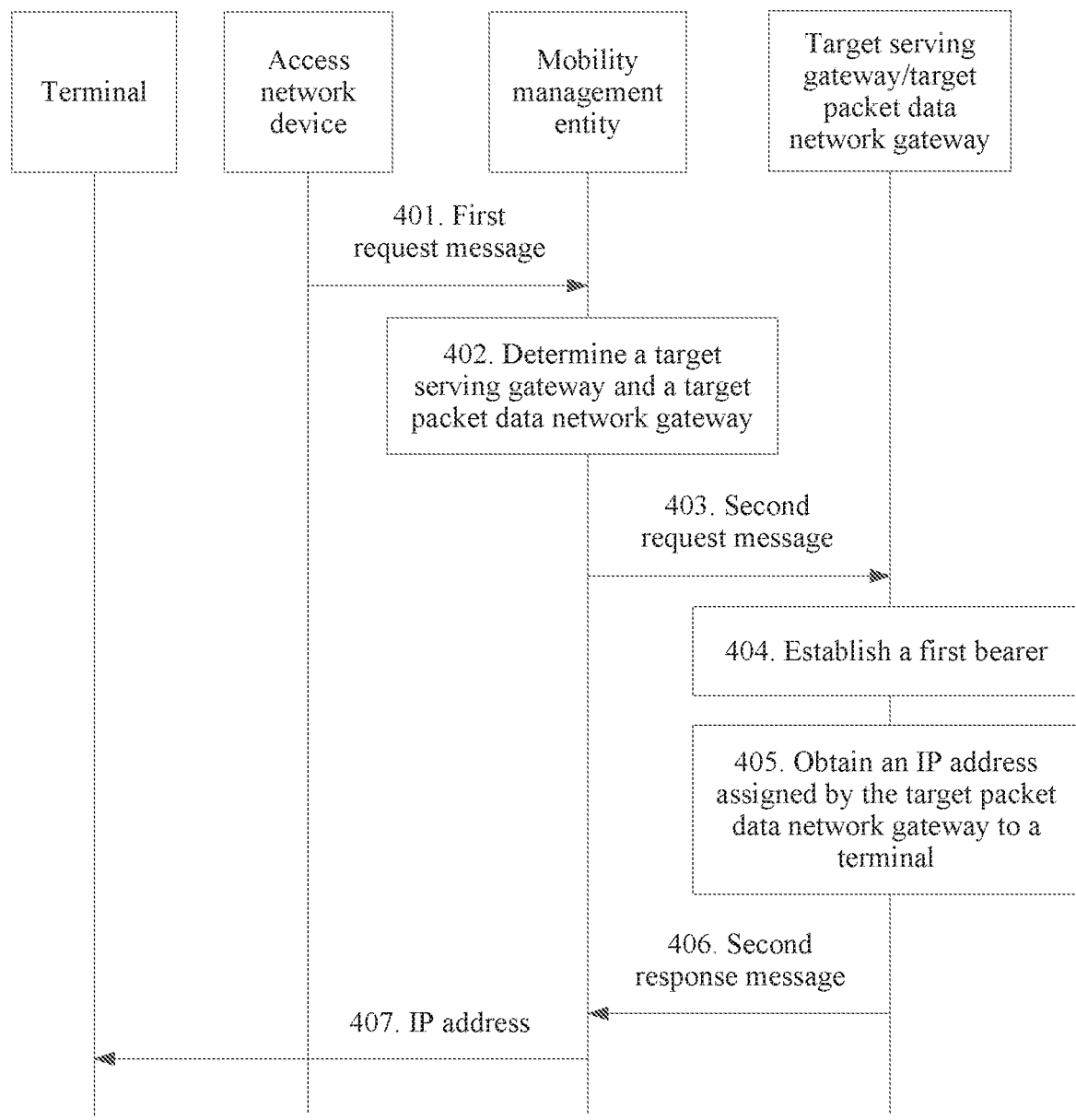
FIG. 4 is a flowchart of a bearer establishment method according to an embodiment of the present application.

FIG. 4 is a flowchart of a bearer establishment method according to an embodiment of the present application. An example in which the method is applied to the communications system 30 shown in FIG. 3 is used for description in this embodiment. The method includes the following steps.

Step 401. A mobility management entity receives a first request message sent by an access network device.

The first request message is sent by the access network device to the mobility management entity in a cell handover process of a terminal. The access network device is a source access network device or a target access network device of the terminal. When the cell handover process is cell handover inside the access network device, a source cell and a target cell belong to a same access network device, that is, the source access network device and the target access network device may be a same access network device.

It should be noted that, when a terminal disposed on a vehicle moves at a high speed, the terminal is handed over between cells. To be specific, the terminal moves from the source cell of the source access network device to the target cell of the target access network device. Cell handover (Handover) is initiated by the source access network device on a network side. The terminal measures signal quality of a cell (the source cell) in which the terminal is currently located and a neighboring cell, and reports the signal quality to the source access network device. Then, the source access network device determines, based on the signal quality that is of the current cell and the neighboring cell and is reported by the terminal, whether to initiate cell handover and a cell to which the terminal is handed over.

The cell handover process may include a first process used to determine whether the terminal needs to perform cell handover, a second process of establishing a radio bearer between the terminal and the target access network device, and a third process of releasing a radio bearer between the terminal and the source access network device.

Optionally, the first request message is a message sent by the source access network device to the mobility management entity after the first process, or the first request message is a message sent by the target access network device to the mobility management entity after the second process.

For example, in LTE, the cell handover process includes a cell handover process based on an S1 interface and a cell handover process based on an X2 interface.

In the cell handover process based on the S1 interface, the access network device is the source access network device, and the first request message is a handover request (HO Required) message and is sent by the source access network device after the first process. For example, the source access network device sends the first request message after receiving a measurement report reported by the terminal and determining, based on the measurement report, that the terminal needs to perform cell handover.

In the cell handover process based on the X interface, the access network device is the target access network device, and the first request message is a path switch request (Path Switch Request) message and is sent by the target access network device after the second process. For example, the target access network device sends the first request message after receiving a radio resource control connection reconfiguration complete (RRC Connection Reconfiguration Complete) message sent by the terminal. The RRC connection reconfiguration complete message is used to indicate that a radio bearer has been established between the terminal and the target access network device.

Correspondingly, the mobility management entity receives the first request message sent by the access network device.

Step 402. The mobility management entity determines a target serving gateway and a target packet data network gateway based on the first request message.

Optionally, the mobility management entity obtains an identifier of the target cell from the first request message, and determines the target serving gateway and the target packet data network gateway for the terminal based on the identifier of the target cell. The identifier of the target cell may be represented by using a local network identifier (Local Network ID) or a cell identifier.

Generally, an identifier of each target cell is corresponding to a serving gateway and a packet data network gateway of the target cell. For example, a cell 1 is corresponding to a serving gateway 1 and a packet data network gateway 1, and a cell 2 is corresponding to a serving gateway 2 and a packet data network gateway 2.

Step 403. The mobility management entity sends a second request message to the target serving gateway.

Optionally, the second request message is a create session request (Create Session Request) message. The second request message is used to request the target serving gateway to establish a first bearer for the terminal, and the first bearer is a bearer between the target serving gateway and the target packet data network gateway.

Correspondingly, the target serving gateway receives the second request message sent by the mobility management entity.

Step 404. The target serving gateway establishes a first bearer based on the second request message.

Optionally, the target serving gateway obtains address information of the target packet data network gateway from the second request message, and establishes the first bearer with the target packet data network gateway based on the address information of the target packet data network gateway.

In a process of establishing the first bearer, the target packet data network gateway assigns an IP address to the terminal.

Step 405. The target serving gateway obtains an IP address assigned by the target packet data network gateway to a terminal.

Step 406. The target serving gateway sends a second response message to the mobility management entity.

Optionally, the second response message is a create session response (Create Session Response) message. The second response message carries the IP address assigned to the terminal.

Correspondingly, the mobility management entity receives the second response message sent by the target serving gateway.

Step 407. The mobility management entity sends the IP address to the terminal.

In the foregoing embodiment, the first request message is a message sent by the access network device to the mobility management entity in the cell handover process of the terminal. After the mobility management entity receives the first request message, the mobility management entity determines the target serving gateway and the target packet data network gateway based on the first request message, and requests the target serving gateway to establish the first bearer for the terminal. In this way, the process of establishing the first bearer and the cell handover process are completed in parallel, so that the terminal can perform communication through the first bearer after a cell handover. Therefore, time consumed in an entire handover process is reduced, and a requirement of a V2X message on a transmission latency is met.

The cell handover process includes two types of processes: the cell handover process based on the X2 interface and the cell handover process based on the S1 interface. Because the cell handover process based on the X2 interface is more common, a next embodiment describes the embodiments of the present application in detail with reference to the cell handover process based on the X2 interface.

In the next embodiment, an example in which the terminal is UE and the access network device is an eNB is used for description.

Figure 2:
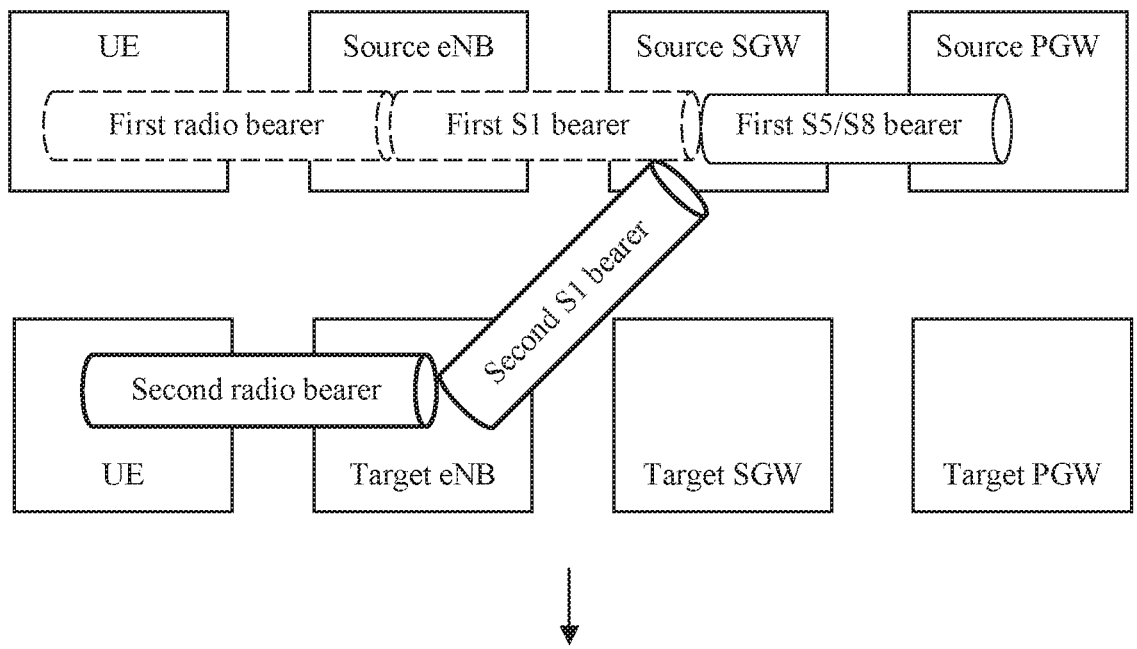
FIG. 2 is a schematic diagram of a principle of a cell handover process and a PGW handover process in the prior art.
Figure 2:
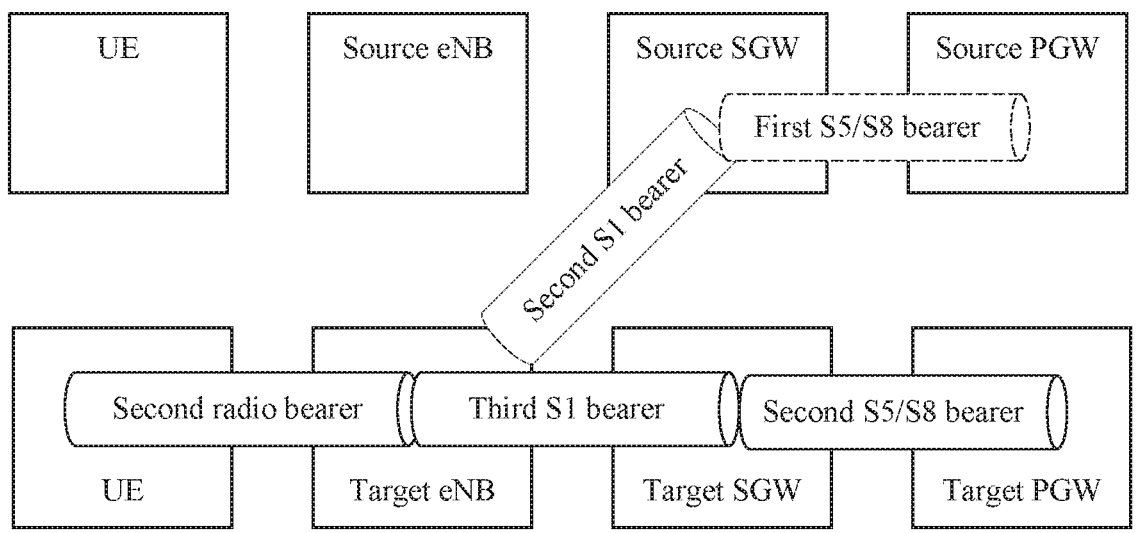
Figure 5A:
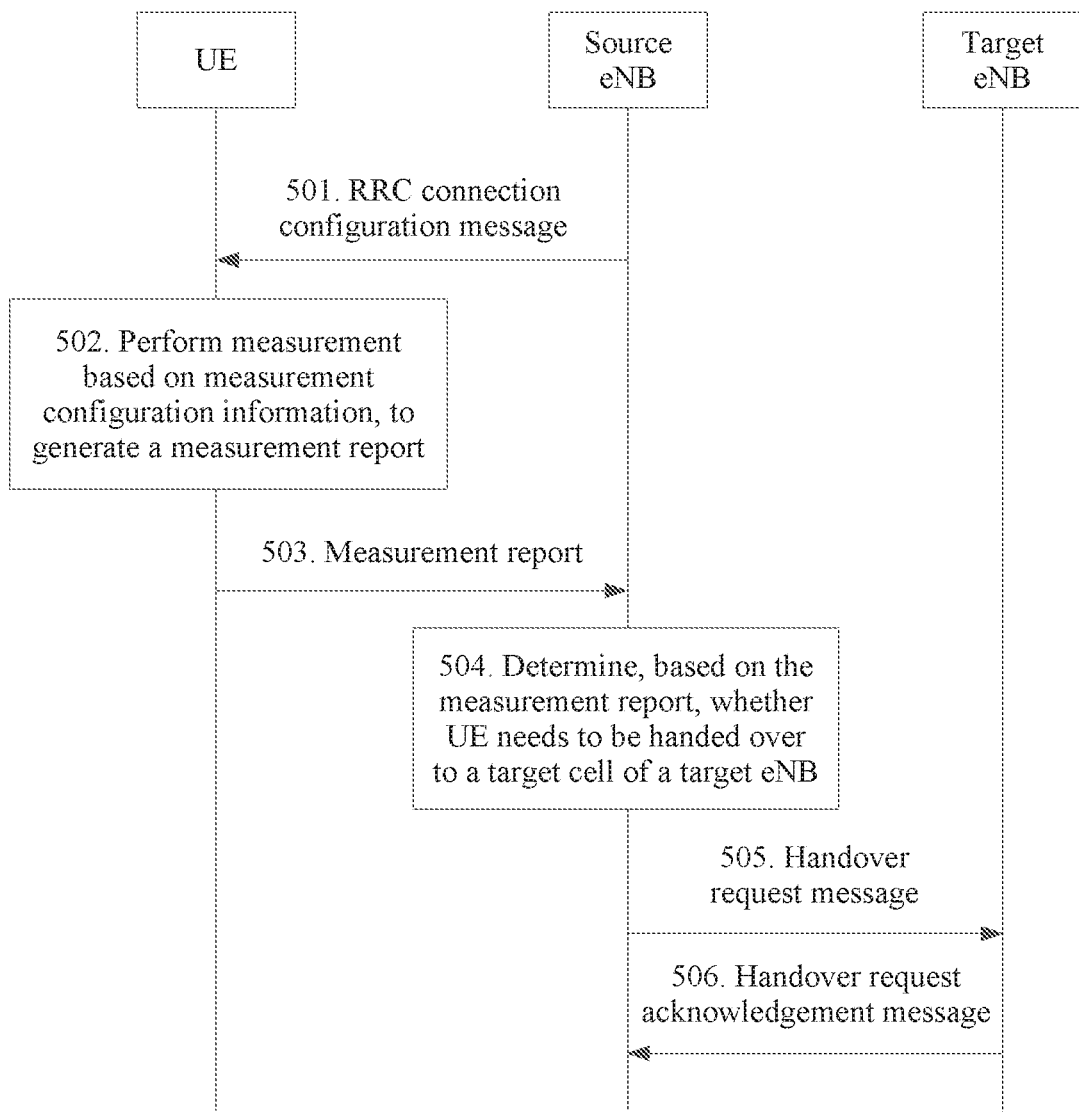
FIG. 5A is a flowchart of a first part of a bearer establishment method according to an embodiment of the present application.
Figures 1, 5B:
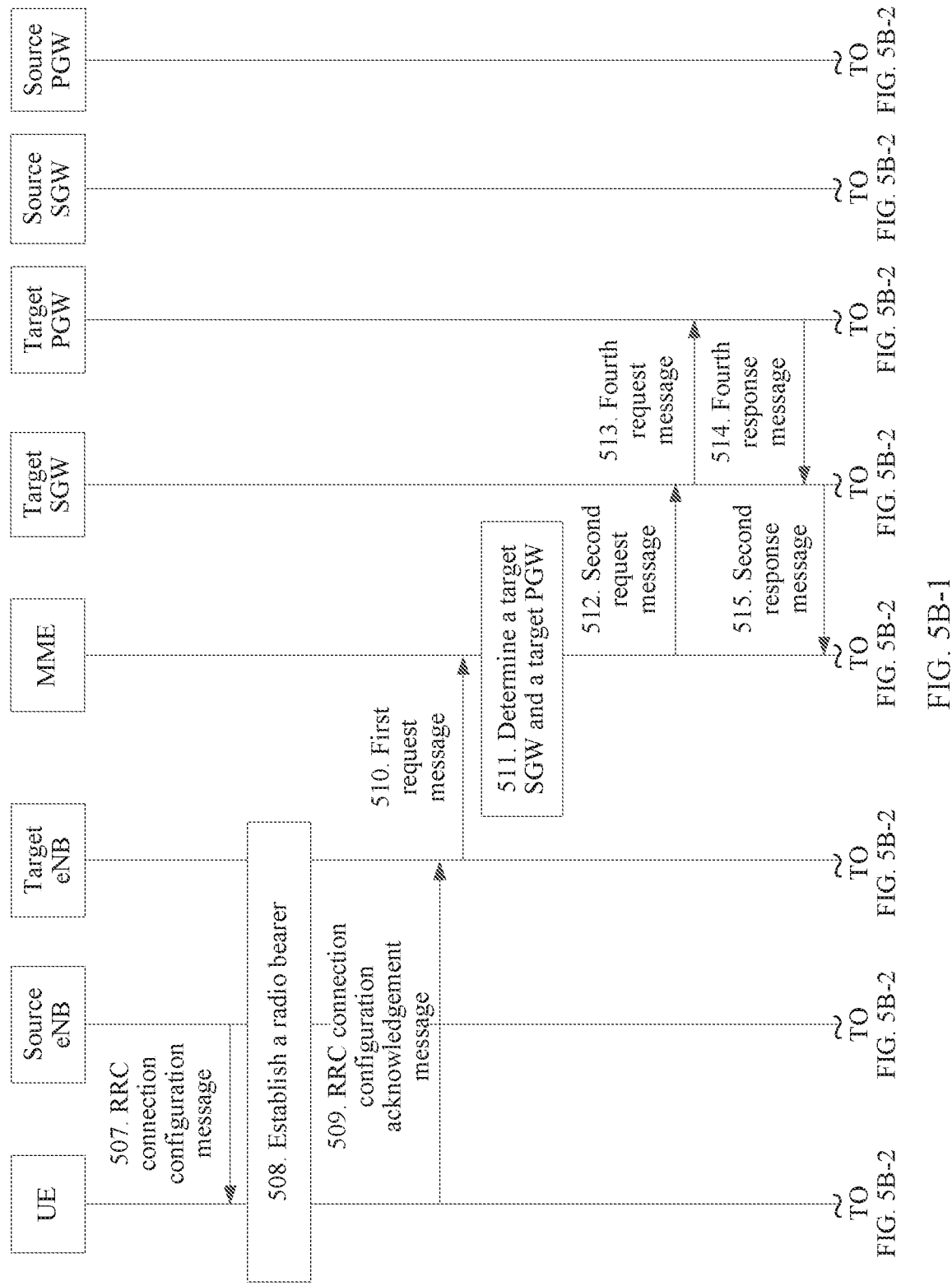
Figures 2, 5B:
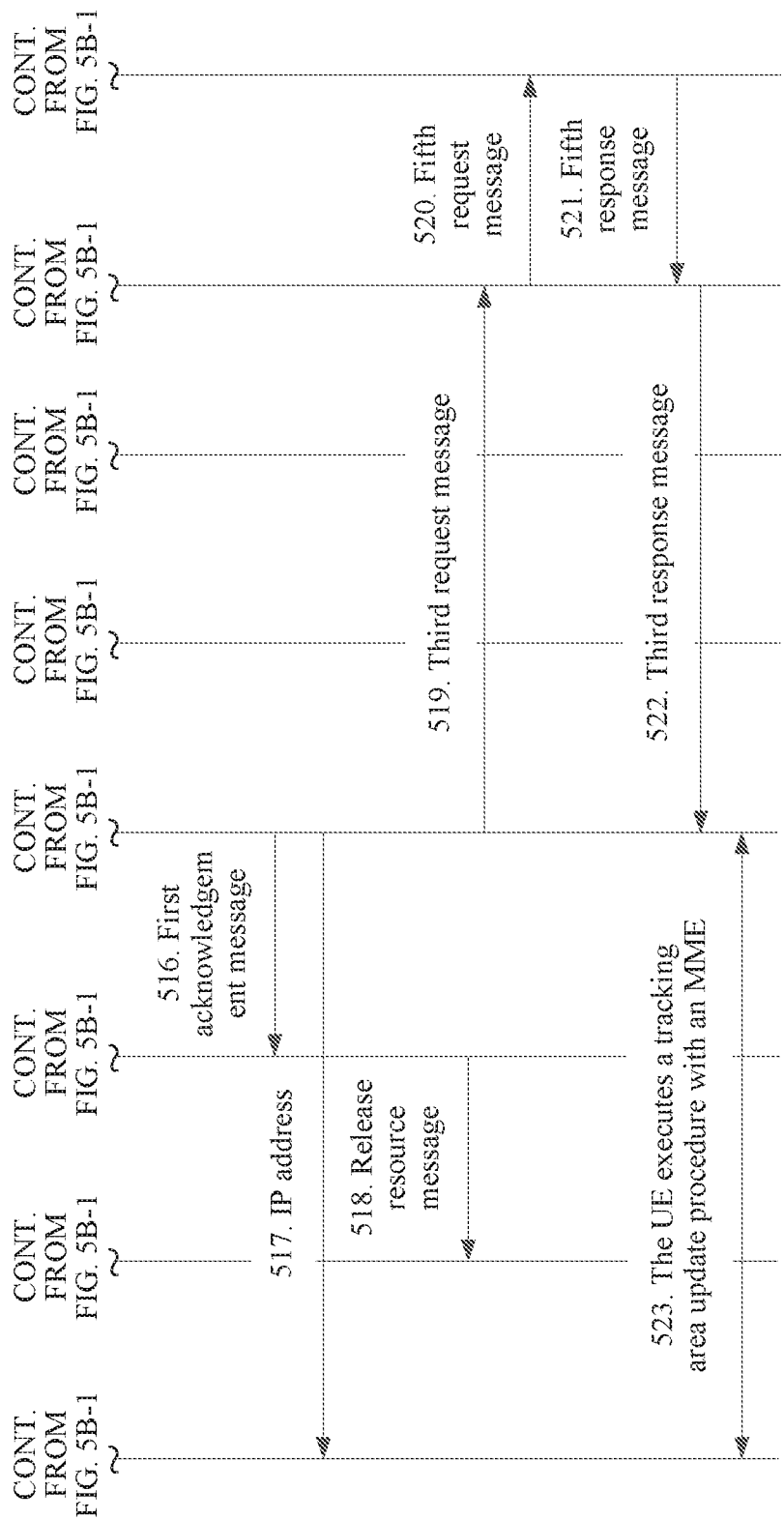

FIG. 5A to FIG. 5B-2 are a flowchart of a bearer establishment method according to an embodiment of the present application. An example in which the bearer establishment method is applied to the communications system shown in FIG. 3 is used for description in this embodiment. The method includes the following steps.

Step 501. A source eNB delivers a radio resource control (Radio Resource Control, RRC) connection configuration message to UE, where the RRC connection configuration message carries measurement configuration information.

The measurement configuration information is a measurement policy used to configure the UE to perform cell measurement.

Correspondingly, the UE receives the RRC connection configuration message sent by the source eNB, and obtains the measurement configuration information from the RRC connection configuration message.

Step 502. The UE performs measurement based on the measurement configuration information, to generate a measurement report.

The measurement report (Measurement Report) includes signal quality that is of all cells and can be measured in a location of the UE.

Step 503. The UE sends the measurement report to the source eNB.

Correspondingly, the source eNB receives the measurement report sent by the UE.

Step 504. The source eNB determines, based on the measurement report, that the UE needs to be handed over to a target cell of a target eNB.

Specifically, the source eNB determines, based on the measurement report of the UE, that the UE needs to be handed over from a source cell on which the UE currently camps to the target cell of the target eNB. For example, when signal quality that is of the source cell and is measured by the UE is poorer than a first condition, and signal quality that is of the target cell and is measured by the UE is better than a second condition, the source eNB determines that the UE needs to be handed over from the source cell to the target cell.

In this embodiment, an example in which the UE needs to be handed over from the source cell to the target cell is used for description.

Step 505. The source eNB sends a handover request message to the target eNB.

Optionally, the handover request (Handover Request) message is used to query whether the target eNB allows the handover.

Correspondingly, the target eNB receives the handover request message sent by the source eNB. The target eNB reserves a corresponding resource for the UE based on the handover request message, for example, a resource used to establish a radio bearer between the terminal and the target eNB, a cell radio network temporary identifier (Cell Radio Network Temporary Identifier, C-RNTI), or a dedicated random access pilot.

Step 506. The target eNB sends a handover request acknowledgement message to the source eNB.

After reserving the resource, the target eNB sends the handover request acknowledgement (Handover Request Acknowledge) message to the source eNB. The handover request acknowledgement message is used to indicate that the target eNB allows the handover and reserves the corresponding resource.

Optionally, the handover request acknowledgement message carries a dedicated access pilot allocated by the target eNB to the UE.

Correspondingly, the source eNB receives the handover request acknowledgement message sent by the target eNB.

Step 507. The source eNB sends an RRC connection configuration message to the UE.

The RRC connection configuration message is used to instruct the UE to perform cell handover. Optionally, the RRC connection configuration message carries the dedicated access pilot allocated by the target eNB to the UE.

Correspondingly, the UE receives the RRC connection configuration message.

Step 508. The UE establishes a radio bearer based on the RRC connection configuration message.

The radio bearer is a bearer between the UE and the target eNB.

The UE obtains the dedicated access pilot from the RRC connection configuration message, and establishes a radio bearer on a target side with the target eNB by using the dedicated access pilot.

Step 509. The UE sends an RRC connection configuration acknowledgement message to the target eNB.

The RRC connection configuration acknowledgement message is used to indicate that the UE has accessed the target cell and established the radio bearer on the target side with the target eNB.

At this point, the radio bearer between the UE and the target eNB is established.

Step 510. The target eNB sends a first request message to an MME. Optionally, the first request message is a path switch request message.

The first request message is sent by the target eNB in a cell handover process of the UE. In this embodiment, the first request message is used to request the MME to determine a target SGW of the UE and a target PGW of the UE.

Optionally, the first request message carries a local network identifier or a cell identifier that is corresponding to the target cell, an identifier of the UE, information about a bearer that needs to be established for the UE, and a GPRS tunneling protocol (GTP) "address+tunnel endpoint identifier (TEID)" of the target eNB on an S1-U interface.

The GTP "address+TEID" of the target eNB on the S1-U interface is address information used to receive downlink data on an S1 bearer on the target side. The S1 bearer on the target side is a bearer between the target eNB and the target SGW. The GTP "address+TEID" is an IP address and a TEID in GTP.

Correspondingly, the MME receives the path switch request message sent by the target eNB.

Step 511. The MME determines a target SGW and a target PGW based on the first request message.

Optionally, the MME obtains an identifier of the target cell based on the first request message, and the MME determines the target SGW and the target PGW for the UE based on the identifier of the target cell.

The identifier of the target cell may be the local network identifier corresponding to the target cell or the cell identifier corresponding to the target cell.

In a first implementation of this step, the MME stores a correspondence between "a local network identifier and/or a cell identifier" of the target cell and "an SGW+a PGW". For example, the correspondence includes "a local network identifier 1, an SGW 1, and a PGW 1", "a cell identifier 2, an SGW 2, and a PGW 2", "a cell identifier 3, an SGW 3, and a PGW 3", and the like. The MME searches the correspondence based on the local network identifier and/or the cell identifier of the target cell, to obtain the target SGW and the target PGW.

For example, for the correspondence "a cell identifier 2, an SGW 2, and a PGW 2", the cell identifier 2 is the target cell, and the PGW 2 is a local gateway disposed near the target eNB. Because the PGW 2 is relatively close to the target eNB, the PGW 2 can provide a PDN service with a relatively small latency for the target cell. For the correspondence "a cell identifier 3, an SGW 3, and a PGW 3", the cell identifier 3 is the target cell, and the PGW 3 is a local gateway disposed near the target eNB. Because the PGW 3 is relatively close to the target eNB, the PGW 3 can provide a PDN service with a relatively small latency for the target cell.

In a second implementation of this step, the MME sends the identifier of the target cell to another network element such as a domain name system (DNS), so that the DNS determines the target SGW of the UE and the target PGW of the UE based on the identifier of the target cell, and the DNS feeds back information about the target SGW and the target PGW.

Optionally, the DNS stores a correspondence between "a local network identifier and/or a cell identifier" of the target cell and "an SGW+a PGW". For example, the correspondence includes "a local network identifier 2, an SGW 4, and a PGW 4", "a cell identifier 4, an SGW 5, and a PGW 5", "a cell identifier 5, an SGW 6, and a PGW 6", and the like.

Step 512. The MME sends a second request message to the target SGW.

Optionally, the second request message is used to request the target SGW to establish a first bearer for the UE. The first bearer is a bearer between the target SGW and the target PGW. For example, the bearer is an S5/S8 bearer.

Optionally, the second request message is a create session request (Create Session Request) message. The create session request message carries address information of the target PGW and first indication information. The first indication information is used to instruct the target SGW to establish the first bearer for the UE. The first indication information may also be referred to as new PDN connection establishment indication information.

Optionally, the second request message further carries the GTP "address+TEID" of the target eNB on the S1-U interface, the identifier of the UE, quality of service (QoS) information of the first bearer, and a GTP "address+TEID" of the MME on an S11 interface.

The MME sends the second request message to the target SGW on the S11 interface. Correspondingly, the target SGW receives the second request message sent by the MME.

Step 513. The target SGW sends a fourth request message to the target PGW based on the second request message.

The target SGW obtains, from the second request message, the address information of the target PGW, the first indication information, the GTP "address+TEID" of the target eNB on the S1-U interface, the identifier of the UE, the quality of service (QoS) information of the first bearer, and the GTP "address+TEID" of the MME on the S11 interface.

After obtaining the GTP "address+TEID" of the target eNB on the S1-U interface, the target SGW is capable of sending downlink data to the target eNB, that is, a downlink GTP tunnel on the S1 bearer on the target side is constructed.

The target SGW sends the fourth request message to the target PGW on an S5/S8 interface based on the information about the target PGW. The fourth request message is used to request the target PGW to establish the first bearer. Optionally, the fourth request message is a create session request message.

Optionally, the fourth request message carries the identifier of the UE, a GTP "address+TEID" of the target SGW on the S5/S8 interface, and the QoS information.

The GTP "address+TEID" of the target SGW on the S5/S8 interface is address information used to receive downlink data on the first bearer (the S5/S8 bearer on the target side).

The target SGW sends the fourth request message to the target PGW on the S5/S8 interface. Correspondingly, the target PGW receives the fourth request message sent by the target SGW. The target PGW obtains the identifier of the UE, the GTP "address+TEID" of the target SGW on the S5/S8 interface, and the QoS information from the fourth request message.

Step 514. The target PGW returns a fourth response message to the target SGW.

The target PGW obtains the identifier of the UE and the GTP "address+TEID" of the target SGW on the S5/S8 interface from the fourth request message.

After obtaining the GTP "address+TEID" of the target SGW on the S5/S8 interface, the target PGW is capable of sending downlink data to the target SGW, that is, a downlink GTP tunnel on the first bearer (the S5/S8 bearer on the target side) is constructed.

The target PGW further assigns an IP address to the UE based on the identifier of the UE, and establishes a UE context.

The target PGW generates the fourth response message. Optionally, the fourth response message is a create session response (Create Session Response) message. The fourth response message carries the identifier of the UE, the IP address assigned to the UE, a GTP "address+TEID" of the target PGW on the S5/S8 interface, and QoS information obtained after negotiation.

The GTP "address+TEID" of the target PGW on the S5/S8 interface is address information used to receive uplink data on the first bearer (the S5/S8 bearer on the target side).

The target PGW sends the fourth response message to the target SGW on the S5/S8 interface. Correspondingly, the target SGW receives the fourth response message sent by the target PGW.

After obtaining the GTP "address+TEID" of the target PGW on the S5/S8 interface, the target SGW is capable of sending uplink data to the target PGW, that is, an uplink GTP tunnel on the first bearer (the S5/S8 bearer on the target side) is constructed.

Step 515. The target SGW returns a second response message to the MME.

Optionally, the second response message carries the identifier of the UE, the IP address assigned to the UE, and a GTP "address+TEID" of the target SGW on the S1-U interface.

The GTP "address+TEID" of the target SGW on the S1-U interface is address information used to receive uplink data on the S1 bearer on the target side.

The target SGW sends the second response message to the MME through the S11 interface. Optionally, a destination address of the second response message is the GTP "address+TEID" of the MME. Correspondingly, the MME receives the second response message sent by the target SGW.

Step 516. The MME sends a first acknowledgement message to the target eNB.

Optionally, the first acknowledgement message is a path switch acknowledgement (Path Switch Acknowledge) message. The first acknowledgement message carries third indication information. The third indication information is used to request the target eNB to establish an S1 bearer for the UE, and the S1 bearer is a bearer between the target eNB and the target SGW. The first indication information and the third indication information may also be referred to as new PDN connection establishment indication information.

Optionally, the first acknowledgement message further carries the GTP "address+TEID" of the target SGW on the S1-U interface.

The MME sends the first acknowledgement message to the target eNB through an S1-C interface. Correspondingly, the target eNB receives the first acknowledgement message sent by the MME.

The target eNB establishes the S1 bearer on the target side for the UE based on the first acknowledgement message, and the S1 bearer is a bearer between the target eNB and the target SGW. To be specific, after obtaining the GTP "address+TEID" of the target SGW on the S1-U interface, the target eNB is capable of sending uplink data to the target SGW, that is, an uplink GTP tunnel on the S1 bearer on the target side is constructed.

Step 517. The MME sends an IP address to the UE.

Optionally, the MME sends the IP address to the UE by using a NAS message, and the IP address is an IP address used in a PDN connection on the target side.

Figure 1:
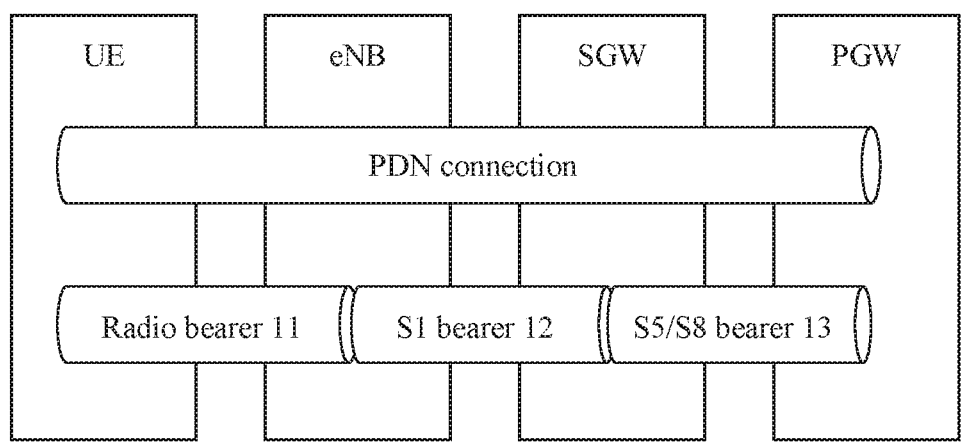
FIG. 1 is a schematic diagram of three bearers included in a PDN connection.
Figures 1, 5C:
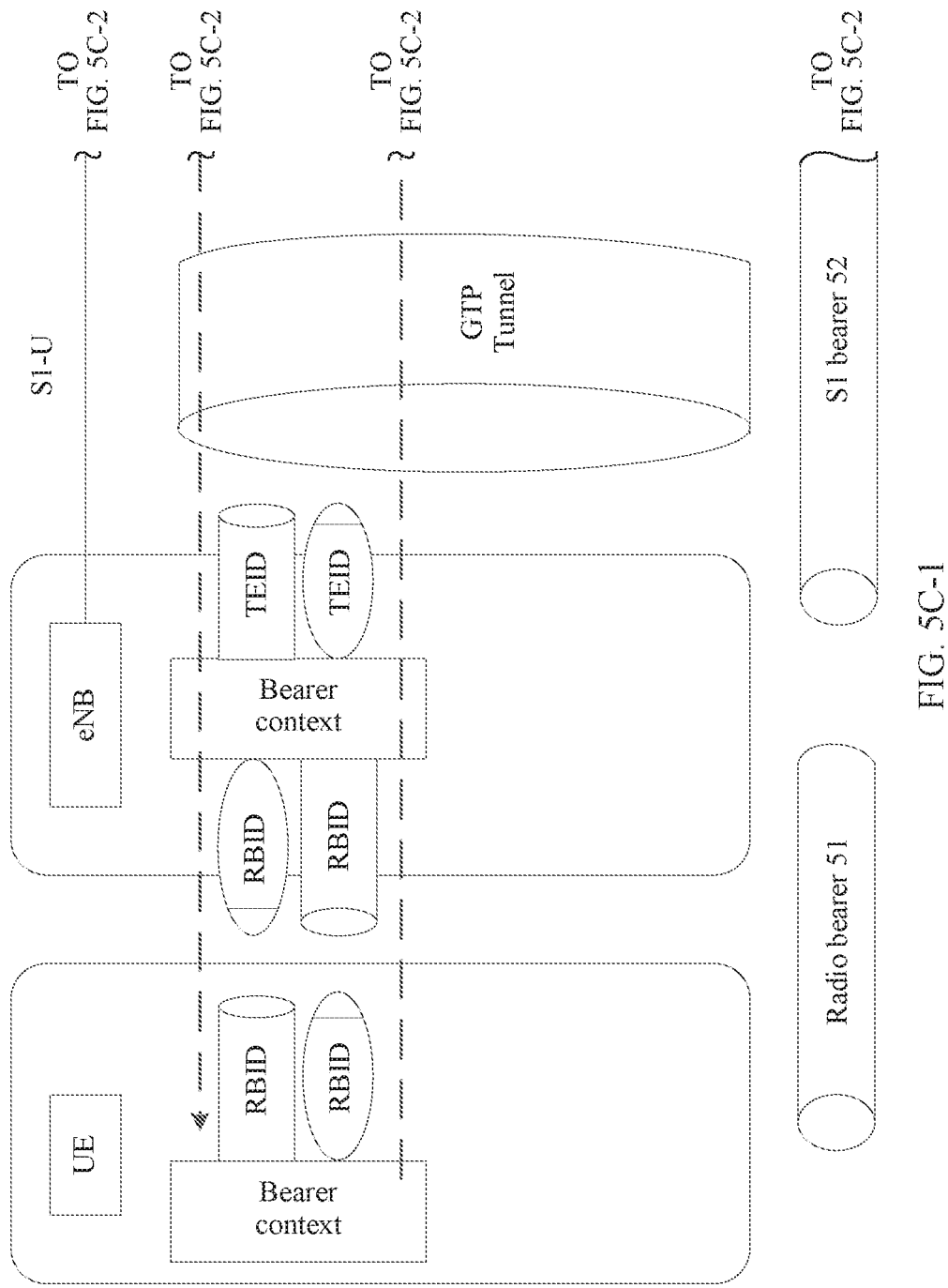
Figures 2, 5C:
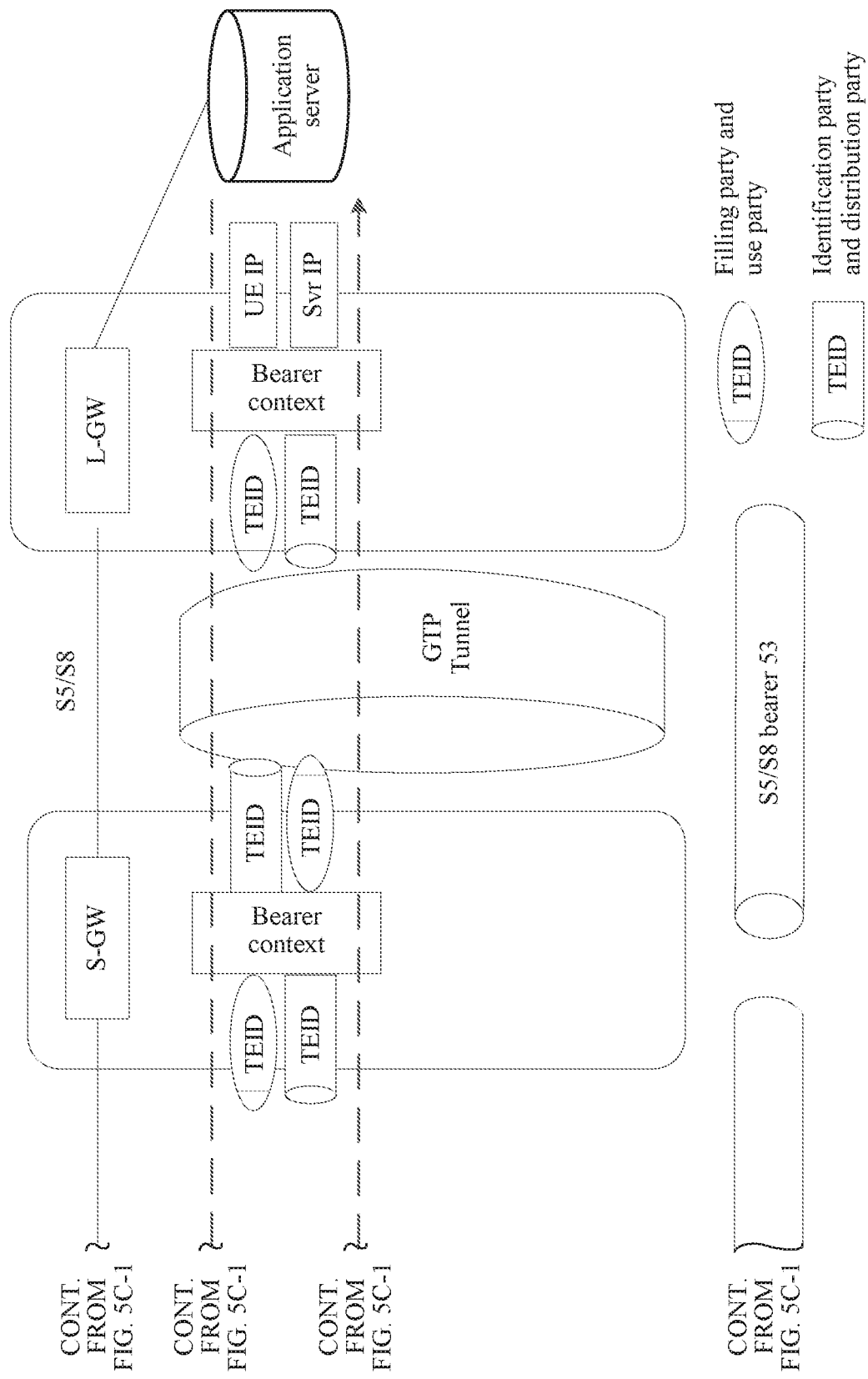

At this point, entire PDN connection establishment on the target side is completed. Referring to FIGS. 5C-1 and 5C-2, the PDN connection on the target side includes three bearers on the target side: a radio bearer S1, an S1 bearer 52, and an S5/S8 bearer 53.

When sending downlink data, an application server sends the downlink data to the target PGW by using the IP address "UE IP" of the UE as a destination address. The target PGW sends the downlink data to the target SGW by using the GTP "address+TEID" of the target SGW on the S5/S8 interface as a destination address. The target SGW sends the downlink data to the target eNB by using the GTP "address+TEID" of the target eNB on the S1-U interface as a destination address. The target eNB sends the downlink data to the UE by using a radio bearer identifier (RB ID) of the UE as a target address. The RB ID is allocated by the target eNB.

When sending uplink data, the UE sends the uplink data to the target eNB by using an RB ID of the target eNB as a target address. The target eNB sends the uplink data to the target SGW by using the GTP "address+TEID" of the target SGW on the S1-U interface as a destination address. The target SGW sends the uplink data to the target PGW by using the GTP "address+TEID" of the target PGW on the S5/S8 interface as a destination address. The target PGW sends the uplink data to the application server by using an IP address "Svr IP" of the application server as a target address.

Step 518. The target eNB sends a release resource message to the source eNB.

The release resource (Release Resource) message is used to release a radio bearer between the source eNB and the UE.

Optionally, the release resource message carries fourth indication information. The fourth indication information is used to instruct the source eNB to release a radio bearer and an S1 bearer. The radio bearer is a bearer between the source eNB and the UE, and the S1 bearer is a bearer between the source eNB and a source SGW. The fourth indication information may also be referred to as a source-side PDN connection release indication.

Correspondingly, the target eNB sends the release resource message to the source eNB through an X2 interface. Correspondingly, the source eNB receives the release resource message. The source eNB releases the radio bearer and the S1 bearer that are corresponding to the UE.

Step 519. The MME sends a third request message to a source SGW.

Optionally, the third request message is a delete session request (Delete Session Request) message. The third request message is used to request the source SGW to delete a second bearer corresponding to the UE. The second bearer is an S5/S8 bearer between the source SGW and a source PGW.

Optionally, the third request message carries second indication information. The second indication information is indication information used to instruct the source SGW to delete the second bearer corresponding to the UE. Optionally, the second indication information is further used to instruct the source SGW to delete a third bearer corresponding to the UE, and the third bearer is the S1 bearer between the source SGW and the source eNB.

The MME sends the third request message to the source SGW through an S11 interface. Correspondingly, the source SGW receives the third request message sent by the MME. The source SGW deletes, based on the third request message, the second bearer and the third bearer that are corresponding to the UE, that is, the source SGW deletes the S5/S8 bearer and the S1 bearer that are located on the source SGW and are corresponding to the UE.

Step 520. The source SGW sends a fifth request message to the source PGW.

Optionally, the fifth request message is a delete session request (Delete Session Request) message. The fifth request message is used to request the source PGW to delete the second bearer corresponding to the UE.

The source SGW sends the fifth request message to the source PGW through an S5/S8 interface. Correspondingly, the source PGW receives the fifth request message. The source PGW deletes the second bearer corresponding to the UE, that is, the source PGW deletes the S5/S8 bearer that is located on the source PGW and is corresponding to the UE.

Step 521. The source PGW sends a fifth response message to the source SGW.

Optionally, the fifth response message is a delete session response (Delete Session Response) message. The fifth response message is used to indicate that the source PGW has deleted the second bearer.

Step 522. The source SGW sends a third response message to the MME.

Optionally, the third response message is a delete session response message. The third response message is used to indicate that the source SGW has deleted the second bearer corresponding to the UE, that is, the source SGW has deleted the S5/S8 bearer between the source SGW and the source PGW. Optionally, the third response message is further used to indicate that the source SGW has deleted the third bearer corresponding to the UE. The third bearer is the S1 bearer between the source eNB and the source SGW.

Step 523. The UE executes a tracking area update procedure with the MME.

Optionally, after entering the new target cell (a tracking area), the UE executes the tracking area update (TAU) procedure with the MME.

At this point, an entire handover process is completed.

In conclusion, in this implementation, the first request message is a message sent by the access network device to the mobility management entity in the cell handover process of the terminal. After the mobility management entity receives the first request message, the mobility management entity determines the target serving gateway and the target packet data network gateway based on the first request message, and requests the target serving gateway to establish the first bearer for the terminal. In this way, a process of establishing the first bearer and the cell handover process are completed in parallel, so that the terminal can perform communication through the first bearer after a cell handover. Therefore, time consumed in the entire handover process is reduced, and a requirement of a V2X message on a transmission latency is met.

In addition, in this embodiment, the first bearer between the target SGW and the target PGW is first established for the UE, and then the second bearer between the source SGW and the source PGW is deleted for the UE. This belongs to "soft handover". Therefore, session continuity of the UE is ensured, and no interruption occurs.

It should be noted that the handover process based on the S1 interface is similar to the embodiment shown in FIG. 5A to FIG. 5B-2. However, because the source eNB and the target eNB no longer exchange information through the X2 interface, the path switch request message sent by the target eNB in step 510 is changed to a handover request message sent by the source eNB.

The following describes apparatus embodiments of the present application. For a part that is not described in detail in the apparatus embodiments, refer to the details in the foregoing method embodiments.

Figure 6:
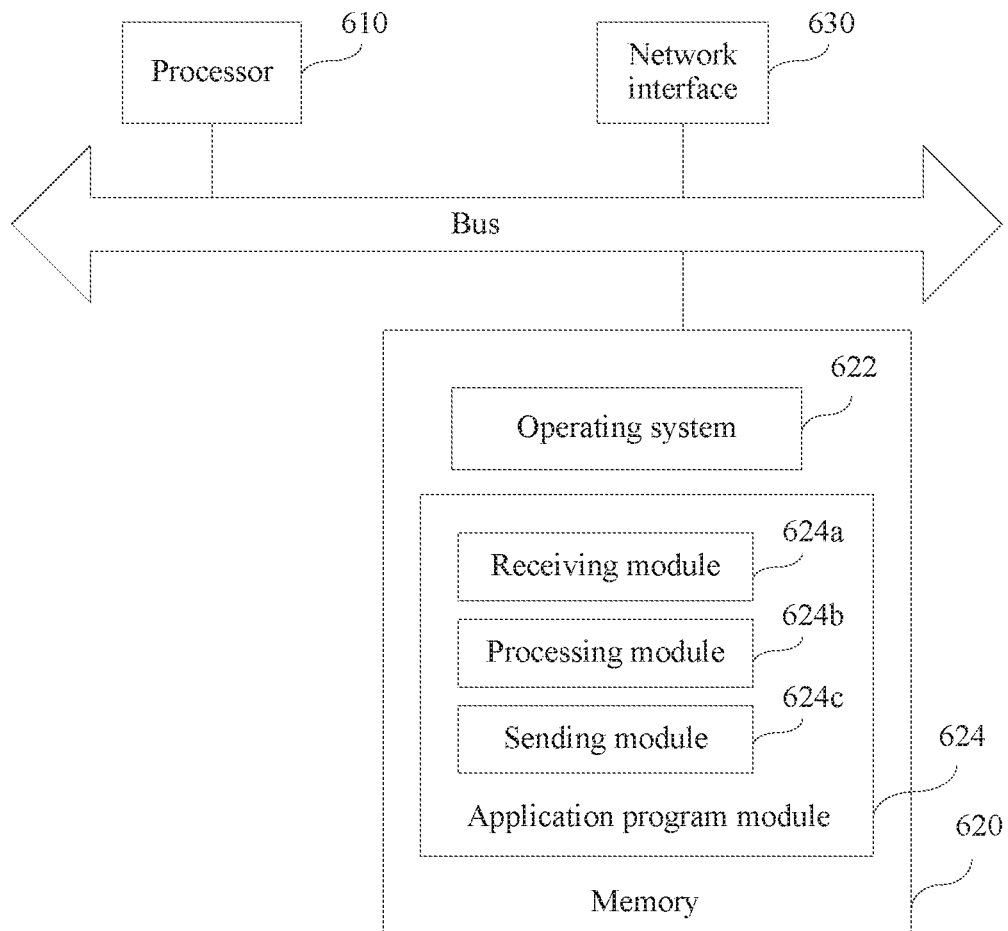
FIG. 6 is a structural block diagram of an MME according to an embodiment of the present application.

FIG. 6 is a structural block diagram of an MME according to an embodiment of the present application. The MME includes a processor 610, a memory 620, and a communications interface 630.

The processor 610 is separately connected to the memory 620 and the communications interface 630 by using a bus.

The communications interface 630 is configured to implement communication with another network element, for example, communication with an eNB or communication with an SGW.

The processor 610 includes one or more processing cores. The processor 610 implements a function of the MME in FIG. 4, FIG. 5A, or FIG. 5B-1 and FIG. 5B-2 by running an operating system or an application program module.

Optionally, the memory 620 may store an operating system 622 and an application program module 624 required by at least one function. Optionally, the application program module 624 includes a receiving module 624a, a processing module 624b, and a sending module 624c. The receiving module 624a is configured to implement steps related to receiving. The processing module 624b is configured to implement steps related to calculation and processing. The sending module 624c is configured to implement steps related to sending.

In addition, the memory 620 may be implemented by any type of volatile or non-volatile storage device or by a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that the structure shown in FIG. 6 imposes no limitation on the MME, and the MME may include more or fewer components than those shown in the figure, or combine some components, or have different component arrangements.

Figure 7:
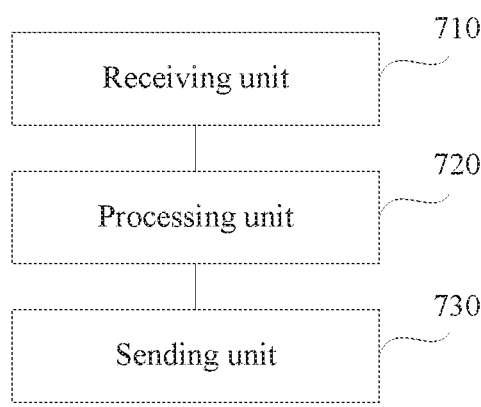
FIG. 7 is a block diagram of a bearer establishment apparatus according to an embodiment of the present application.

FIG. 7 is a block diagram of a bearer establishment apparatus according to an embodiment of the present application. The apparatus may be implemented as all or a part of an MME by using software or hardware. The apparatus includes a receiving unit 710, a processing unit 720, and a sending unit 730.

The receiving unit 710 is configured to implement receiving steps such as step 401, step 406, step 510, step 515, and step 522 in the embodiment in FIG. 4, FIG. 5A, or FIG. 5B-1 and FIG. 5B-2, and another implicit receiving step performed by the MME.

The processing unit 720 is configured to implement processing steps such as step 402 and step 511 in the embodiment in FIG. 4, FIG. 5A, or FIG. 5B-1 and FIG. 5B-2, and another implicit processing step performed by the MME.

The sending unit 730 is configured to implement sending steps such as step 403, step 507, step 509, step 512, step 516, step 517, and step 519 in the embodiment in FIG. 4, FIG. 5A, or FIG. 5B-1 and FIG. 5B-2, and another implicit sending step performed by the MME.

The receiving unit 710 may be implemented by the processor 610 in FIG. 6 by executing the receiving module 624a in the memory 620. The processing unit 720 may be implemented by the processor 610 in FIG. 6 by executing the processing module 624b in the memory 620. The sending unit 730 may be implemented by the processor 610 in FIG. 6 by executing the sending module 624c in the memory 620.

A person of ordinary skill in the art may understand that all or some of the steps of the embodiments may be implemented by hardware or a program instructing related hardware. The program may be stored in a computer readable storage medium. The storage medium may be a read-only memory, a magnetic disk, an optical disc, or the like.

The foregoing descriptions are only example embodiments of the present application, but are not intended to limit the present application. Any modification, equivalent replacement, and improvement made without departing from the spirit and principle of the present application shall fall within the protection scope of the present application.

What is claimed is:

1. A method of bearer establishment, comprising:
receiving, by a mobility management entity, a first request message from an access network device in a cell handover process of a terminal, wherein the access network device is a source access network device of the terminal or a target access network device of the terminal;
determining, by the mobility management entity, a target serving gateway of the terminal and a target packet data network gateway of the terminal based on the first request message;
sending, by the mobility management entity to the target serving gateway a second request message used to request the target serving gateway to establish a first bearer for the terminal, and the first bearer is a bearer between the target serving gateway and the target packet data network gateway;
receiving, by the mobility management entity from the target serving gateway, a second response message carrying an IP address assigned by the target packet data network gateway to the terminal; and
sending, by the mobility management entity to the terminal, the IP address,
wherein the first request message carries an identifier of a target cell of the terminal, and
wherein the determining, by the mobility management entity, a target serving gateway of the terminal and a target packet data network gateway of the terminal based on the first request message comprises:
obtaining, by the mobility management entity, the identifier of the target cell from the first request message; and
determining, by the mobility management entity, the target serving gateway of the terminal and the target packet data network gateway of the terminal based on the identifier of the target cell.

2. The method according to claim 1, wherein
the access network device is the source access network device of the terminal, and the first request message is a handover request message; or
the access network device is the target access network device of the terminal, and the first request message is a path switch request message.

3. The method according to claim 1, wherein the second request message comprises first indication information; and
the first indication information is used to instruct the target serving gateway to establish the first bearer for the terminal.

4. The method according to claim 1, wherein after the receiving, by the mobility management entity from the target serving gateway, a second response message, the method further comprises:
sending, by the mobility management entity to a source serving gateway of the terminal, a third request message used to request the source serving gateway to delete a second bearer corresponding to the terminal, and the second bearer is a bearer between the source serving gateway and a source packet data network gateway of the terminal; and
receiving, by the mobility management entity from the source serving gateway, a third response message.

5. The method according to claim 4, wherein the third request message comprises second indication information, and the second indication information is used to instruct the source serving gateway to delete the second bearer corresponding to the terminal.

6. A bearer establishment apparatus, comprising:
a communications interface configured to receive a first request message from an access network device in a handover process of a terminal, and the access network device is a source access network device of the terminal or a target access network device of the terminal; and
a processor configured to determine a target serving gateway of the terminal and a target packet data network gateway of the terminal based on the first request message; wherein
the communications interface is further configured to:
send to the target serving gateway a second request message used to request the target serving gateway to establish a first bearer for the terminal, and the first bearer is a bearer between the target serving gateway and the target packet data network gateway;
receive from the target serving gateway a second response message carrying an IP address assigned by the target packet data network gateway to the terminal; and
send the IP address to the terminal,
wherein the first request message carries an identifier of a target cell of the terminal, and
wherein the processor is configured to:
obtain the identifier of the target cell from the first request message, and
determine the target serving gateway of the terminal and the target packet data network gateway of the terminal based on the identifier of the target cell.

7. The apparatus according to claim 6, wherein
the access network device is the source access network device of the terminal, and the first request message is a handover request message; or
the access network device is the target access network device of the terminal, and the first request message is a path switch request message.

8. The apparatus according to claim 6, wherein the second request message comprises first indication information; and
the first indication information is used to instruct the target serving gateway to establish the first bearer for the terminal.

9. The apparatus according to claim 6, wherein
the communications interface is configured to send to a source serving gateway of the terminal third request message used to request the source serving gateway to delete a second bearer corresponding to the terminal, and the second bearer is a bearer between the source serving gateway and a source packet data network gateway of the terminal; and
the communications interface is further configured to receive from the source serving gateway a third response message.

10. The apparatus according to claim 9, wherein the third request message comprises second indication information used to instruct the source serving gateway to delete the second bearer corresponding to the terminal.

11. A communication system, comprising:
a mobility management entity; and
an access network device configured to send a first request message to the mobility management entity in a cell handover process of a terminal, wherein the access network device is a source access network device of the terminal or a target access network device of the terminal; and
the mobility management entity is configured to:
receive the first request message;
determine a target serving gateway of the terminal and a target packet data network gateway of the terminal based on the first request message;
send to the target serving gateway a second request message used to request the target serving gateway to establish a first bearer for the terminal, and the first bearer is a bearer between the target serving gateway and the target packet data network gateway;
receive from the target serving gateway a second response message carrying an IP address assigned by the target packet data network gateway to the terminal; and
send to the terminal the IP address,
wherein the first request message carries an identifier of a target cell of the terminal, and
wherein the mobility management entity is further configured to:
obtain from the first request message the identifier of the target cell; and
determine the target serving gateway and the target packet data network gateway based on the identifier of the target cell.

12. The communication system according to claim 11, wherein the target packet data network gateway is configured to:
receive the second request message;
establish the first bearer for the terminal according to the second request message; and
send to the mobility management entity the second response message.

13. The communication system according to claim 11, wherein
the access network device is the source access network device of the terminal, and the first request message is a handover request message; or
the access network device is the target access network device of the terminal, and the first request message is a path switch request message.

14. The communication system according to claim 11, wherein the second request message comprises first indication information; and
the first indication information is used to instruct the target serving gateway to establish the first bearer for the terminal.

* * * * *